(12) United States Patent
Mattes et al.

(10) Patent No.: US 6,960,993 B2
(45) Date of Patent: Nov. 1, 2005

(54) DEVICE FOR TRANSMITTING SIGNALS AND/OR ENERGY TO A VEHICLE SEAT RAIL SYSTEM

(75) Inventors: Bernhard Mattes, Sachsenheim (DE); Ewald Schmidt, Ludwigsburg (DE); Michael Thiel, Leonberg (DE); Hans-Oliver Ruoss, Stuttgart (DE); Jose Madueno, Ludwigsburg (DE); Heiko Fricke, Remshalden-Rohrbronn (DE); Ruediger Klotz, Schorndorf (DE); Jorge Sanchez Arriazu, Stuttgart (DE); Heiko Buehring, Oldenburg (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 10/420,626

(22) Filed: Apr. 22, 2003

(65) Prior Publication Data

US 2004/0048582 A1 Mar. 11, 2004

(30) Foreign Application Priority Data

Apr. 30, 2002 (DE) .............................. 102 19 252
Feb. 26, 2003 (DE) .............................. 103 08 078

(51) Int. Cl.⁷ ............................................. G08B 21/00
(52) U.S. Cl. ...................... 340/438; 340/686.1; 701/45
(58) Field of Search .......................... 340/438, 686.1, 340/531, 532, 533, 534, 535; 318/16, 466, 318/467; 343/711, 772; 701/45; 180/281

(56) References Cited

U.S. PATENT DOCUMENTS

| | | | | |
|---|---|---|---|---|
| 4,451,887 A | * | 5/1984 | Harada et al. ................. | 701/49 |
| 4,997,053 A | * | 3/1991 | Drori et al. .................. | 180/287 |
| 6,255,790 B1 | * | 7/2001 | Popp et al. .................. | 318/280 |
| 6,333,686 B1 | * | 12/2001 | Waltzer ....................... | 340/438 |
| 6,369,529 B1 | * | 4/2002 | McClintock et al. .......... | 318/16 |
| 6,727,823 B2 | * | 4/2004 | Ando et al. .................. | 340/666 |
| 2004/0100388 A1 | * | 5/2004 | Yoshida et al. ........... | 340/686.1 |

FOREIGN PATENT DOCUMENTS

DE 197 40 732 3/1999 .......... G08C 17/02

\* cited by examiner

*Primary Examiner*—Jeffery Hofsass
*Assistant Examiner*—Jennifer Stone
(74) *Attorney, Agent, or Firm*—Kenyon & Kenyon

(57) ABSTRACT

A device, using which signals and energy may be transmitted without contact between an electrical device on or in the vehicle body and an electrical device on or in a vehicle seat, reliable signal and energy transmission being ensured even in the event of frequent changes of the seating configuration, without the vehicle user having to take special precautions for this purpose. The two electrical devices are each assigned a transmission module. These transmission modules form a high-frequency wireless transmission path. The transmission module on or in the vehicle body is integrated into the rail system for the vehicle seat, while the transmission module on or in the seat may be coupled into the rail system in such a way that the signal and/or energy transmission occurs via the displacement current generated in the rail system.

7 Claims, 3 Drawing Sheets

DEVICE FOR TRANSMITTING SIGNALS AND/OR ENERGY TO A VEHICLE SEAT RAIL SYSTEM

FIELD OF THE INVENTION

The present invention relates to a device for transmitting signals and/or energy between an electrical device on or in the vehicle body and an electrical device on or in a vehicle seat, the two electrical devices each being assigned a transmission module and the two transmission modules forming a high-frequency wireless transmission path.

BACKGROUND INFORMATION

The transmission of data and energy in motor vehicles is typically performed via electrical lines and electrical contacts in the form of plugs. This also applies for signal and energy transmission between a control unit positioned in the vehicle body and electrical devices on and in the vehicle seats, restraint means, such as side airbags and seatbelt tighteners, in particular. Many of today's motor vehicles, such as minivans, offer the possibility of varying the number and arrangement of the available seats as needed by installing, removing, and reconfiguring individual seats or seat banks. In this context, contacting of the electrical devices on or in the vehicle seats via electrical cables and plug contacts has been shown to be problematic. Thus, the production and/or disconnection of the electrical connection represents an additional work step during installation, removal, and reconfiguration of the seats, which is in fact not absolutely necessary for the actual mounting of the seats, but cannot be forgotten in any case, since faulty triggering of the restraint means may have fatal consequences for the occupants. In addition, the guaranteed average service life of plugs which are currently used in connection with restraint systems is merely approximately 50 to 100 plugging and unplugging cycles. In addition, contamination of the plug contacts is to be always expected in the field of motor vehicles, so that in particular in the event of more frequent changes of the seating configuration, impairments of the electrical connection may occur.

A device for wireless transmission of signals and/or energy is described in German patent application No. 197 40 732. The transmission module on or in the vehicle body is connected via a line connection to a monitoring unit of the vehicle and is integrated into the floor or a side panel of the vehicle. The transmission module in the seat is also connected via a line connection to an electrical device of the vehicle seat, such as a seatbelt tightener. Both transmission modules include high-frequency coil antennas which are positioned diametrically opposing one another at a defined distance D when the vehicle seat is locked in properly. In the exemplary embodiment described in German Patent Application No. 197 40 732, the vehicle seat is removable from the vehicle together with its slide rail. The high-frequency coil antenna for the seat is mounted on the slide rail. During installation of the vehicle seat, the slide rail is attached to a defined point of the vehicle floor, so that the high-frequency coil antenna on or in the seat also assumes a defined position in relation to the vehicle floor and the high-frequency coil antenna positioned on or in the vehicle body.

The device described in German Patent Application No. 197 40 732 does overcome some of the problems initially described, which arise in connection with signal and energy transmission via electrical lines and plug contacts. However, it is nonetheless shown to be problematic in the event of more frequent changes of the seating configuration, since, due to their exposed arrangement on the vehicle body and the slide rail, the two high-frequency coil antennas are susceptible to mechanical impairments which are unavoidable during seat mounting. In this way, an undefined change in distance D between the two high-frequency coil antennas may occur, which may in turn lead to impairment of the signal and energy transmission between the two transmission modules.

SUMMARY OF THE INVENTION

The present invention provides a device, using which signals and energy may be transmitted without contact between an electrical device on or in the vehicle body and an electrical device on or in a vehicle seat, reliable signal and energy transmission being ensured even in the event of frequent changes of the seating configuration, without the vehicle user having to take special precautions for this purpose.

This is achieved according to the present invention in that the transmission module on or in the vehicle body is integrated into the rail system for the vehicle seat and the transmission module on or in the seat may be coupled into the rail system in such a way that the signal and/or energy transmission occurs via the displacement current generated in the rail system.

In today's motor vehicles, the rail system for the vehicle seat is integrated into the vehicle floor, and as much as possible in such a way that the vehicle floor represents a flat cargo area when the vehicle seats are removed. The vehicle seats are connected to the rail system via a mechanical coupling device, such as a clamping or locking device, positioned on the seat. It has been recognized according to the present invention that the transmission module on or in the vehicle body may be integrated easily into the rail system and/or that the rail system may be laid out easily as an electrical line for high-frequency signals and energy. In addition, it has been recognized that the integration of the transmission module on or in the vehicle body into the rail system allows signal and energy transmission even in the event of variable positioning of the vehicle seat on the rail system. The displacement current arising in connection with high-frequency electromagnetic fields (frequency $\geq 100$ kHz) is used for this purpose according to the present invention. The displacement current allows signal and energy transmission even without electrical contact, avoiding energy emission into the vehicle interior and interference with other vehicle systems connected therewith by using suitable geometry and layout of the transmission module on or in the vehicle body. According to the present invention, the displacement current generated in the rail system is tapped by the transmission module on or in the seat, which is coupled into the rail system for this purpose.

Since the device according to the present invention allows signal and energy transmission between the vehicle body and the vehicle seat without cable and plug connections, costs associated therewith are dispensed with. Irritating stumbling points, which cable connections in the floor region of the vehicle interior always represent, are eliminated.

Since the device according to the present invention for transmitting signals and/or energy is integrated into the mechanical installation device for the vehicle seat, the vehicle user does not have to actively produce the electrical contacts of the security systems on and in the vehicle seat himself. If the device according to the present invention is used, the individual vehicle seats may therefore be installed and removed as desired, without the safety risk caused by failure or faulty triggering of restraint means being elevated in this way.

In principle there are various possibilities for the implementation of the device according to the present invention, in particular of the transmission module on or in the vehicle body and the transmission module on or in the seat.

As already described, the rail system integrated into the vehicle body may be advantageously implemented in a relatively simple way as an electrical line for high-frequency energy and/or signals. Thus, at least a part of the rail system may be implemented as a coaxial cable, two-wire line, planar structure, or even as a waveguide, for example.

Depending on the implementation of the transmission module on or in the seat, the displacement current generated in the rail system may be tapped capacitively or even inductively. In the case of capacitive coupling, the electrical field lines of the electromagnetic field are captured, while in the case of inductive coupling, the magnetic field lines are captured. If at least a part of the rail system is implemented as an electrical line for high-frequency energy and/or signals, capacitive coupling may be performed simply via a coaxial cable whose inner conductor ends in a coupling pin. For this purpose, the coupling pin is simply introduced into the electromagnetic field in the inside of the electrical cable. Inductive coupling in and out may also be implemented simply in this case via a coaxial cable if the inner conductor of this coaxial cable ends in at least one conductor loop. In this case, the conductor loop is introduced into the electromagnetic field in the inside of the electrical line.

The signal and energy transmission between the transmission module on or in the vehicle body and the transmission module on or in the seat may also be performed via an aperture coupling. In this case, the vehicle-body electrical line for high-frequency energy and/or signals must be provided with apertures and the transmission module on or in the seat must also include an electrical line for high-frequency energy and/or signals which has apertures. If the apertures of the seat electrical line are positioned in accordance with the apertures of the vehicle body electrical line and they are aligned with one another, signal and energy transmission may occur between the two electrical lines.

DETAILED DESCRIPTION

Figure 1:
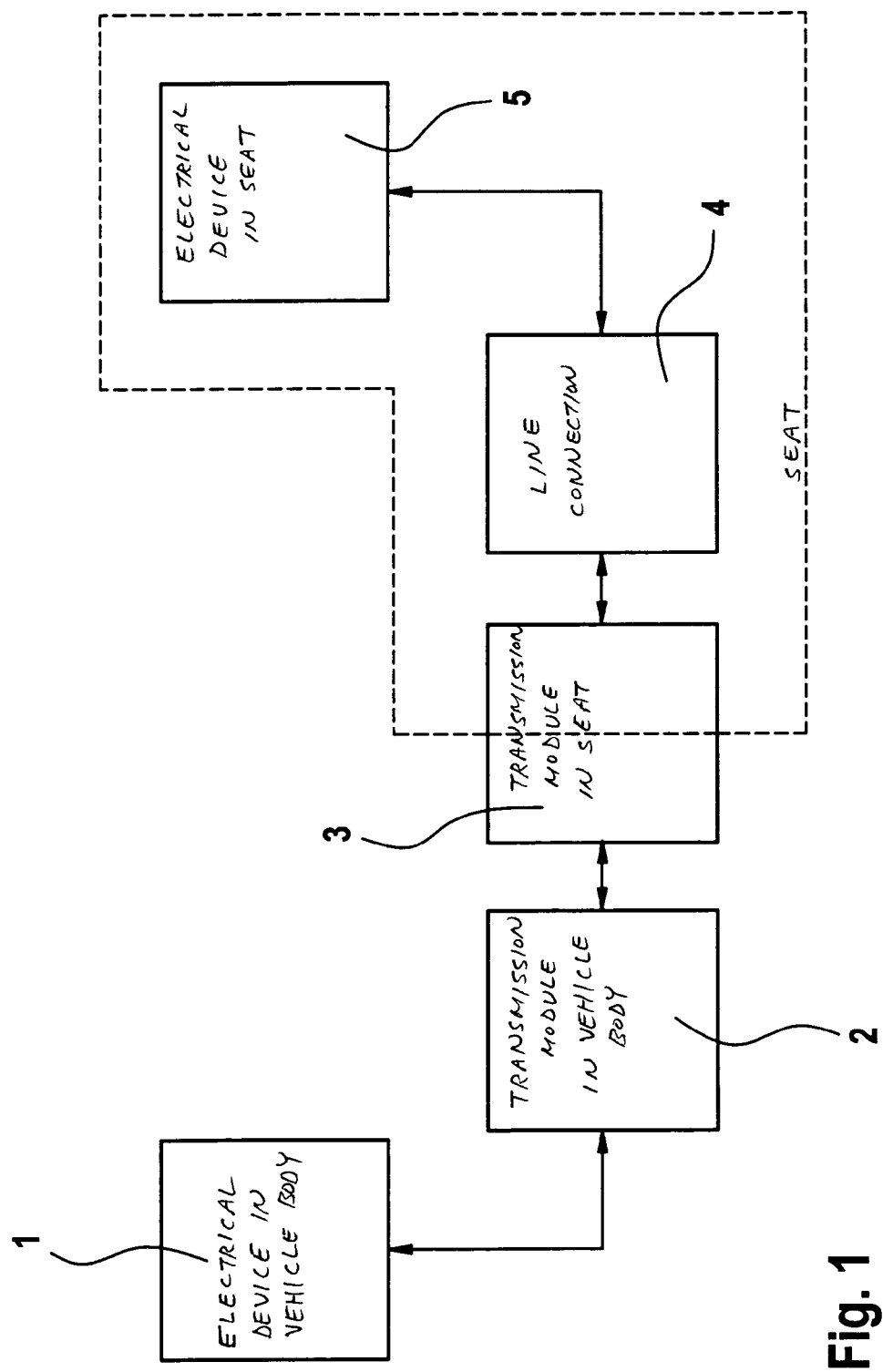
FIG. 1 shows a block diagram which represents the signal and energy transmission between an electrical device positioned on or in a vehicle body and an electrical device positioned on or in a seat.

The block diagram illustrated in FIG. 1 shows, as already explained, a device for transmitting signals and/or energy between an electrical device on or in the vehicle body 1 and an electrical device 5 on or in a vehicle seat. Both electrical devices 1 and 5 may function as both signal and energy sources and as signal and energy sinks. An electrical device on or in the vehicle body 1 may, for example, be a control unit for a safety device or a comfort device in a vehicle seat, which then forms electrical device 5 on or in the seat.

Electrical device 1 is connected via a line connection to a transmission module 2, also positioned on or in the vehicle body. Together with a transmission module 3 assigned to electrical device 5 on or in the seat, these devices form a high-frequency wireless transmission path.

According to the present invention, transmission module 2 on or in the vehicle body is integrated into the rail system, using which the vehicle seat is attached and guided in the vehicle interior. For this purpose, at least a part of the rail system is implemented as an electrical line for high-frequency energy and/or signals.

Figure 2:
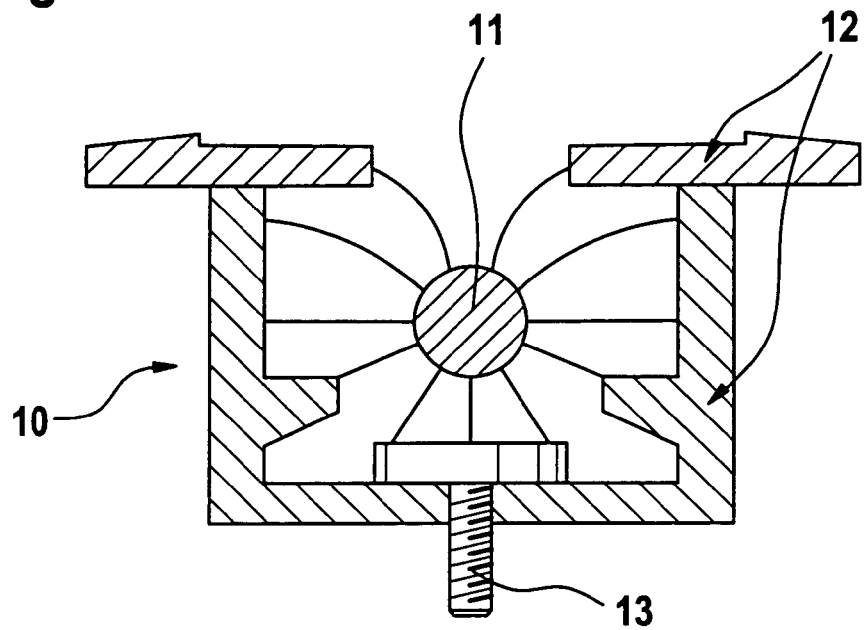
FIG. 2 shows a section through a slide rail for a vehicle seat, which is used as a transmission module on or in the vehicle body of a device according to the present invention.

An electrical line 10 having coaxial structure, which is integrated into the rail system, is illustrated in FIG. 2 for exemplary purposes. FIG. 2 is merely to illustrate the basic principle of this implementation. Electrical line 10 includes an inner conductor 11 and an outer conductor 12, outer conductor 12 being formed by the guide rail for the vehicle seat. This rail is attached via screws 13 on the vehicle floor, i.e., on the vehicle body. Although outer conductor 12 is not completely closed in the exemplary embodiment shown here, in the present case no energy is emitted into the vehicle interior as an antenna would, so that no interference in the sense of EMC or environmental EMC arises.

The actual signal and/or energy transmission into the vehicle seat takes place with the aid of transmission module 3 positioned on or in the seat, which is connected via a line connection 4 to electrical device 5 on or in the seat. For this purpose, the existence of the displacement current as an essential feature of high-frequency electromagnetic fields having a frequency $\geq$ approximately 100 kHz is exploited. This allows signal and/or energy transmission even without electrical contact. As already explained, undesired emission into the vehicle interior may be avoided with suitable layout of the geometry of transmission modules 2 and 3. As long as the signal and/or energy transmission occurs in the high-frequency range, the transmission frequency may be selected freely in consideration of the optimum possible layout of the system. It is to be expressly noted here once again that the device according to the present invention allows fully bidirectional signal and energy transmission.

If transmission module 2 on or in the vehicle body has a coaxial structure, as is illustrated in FIG. 2, for example, injection and tapping of signals and/or energy by transmission module 3 on or in the seat may take place capacitively, inductively or even through aperture coupling, for example.

Figure 3:
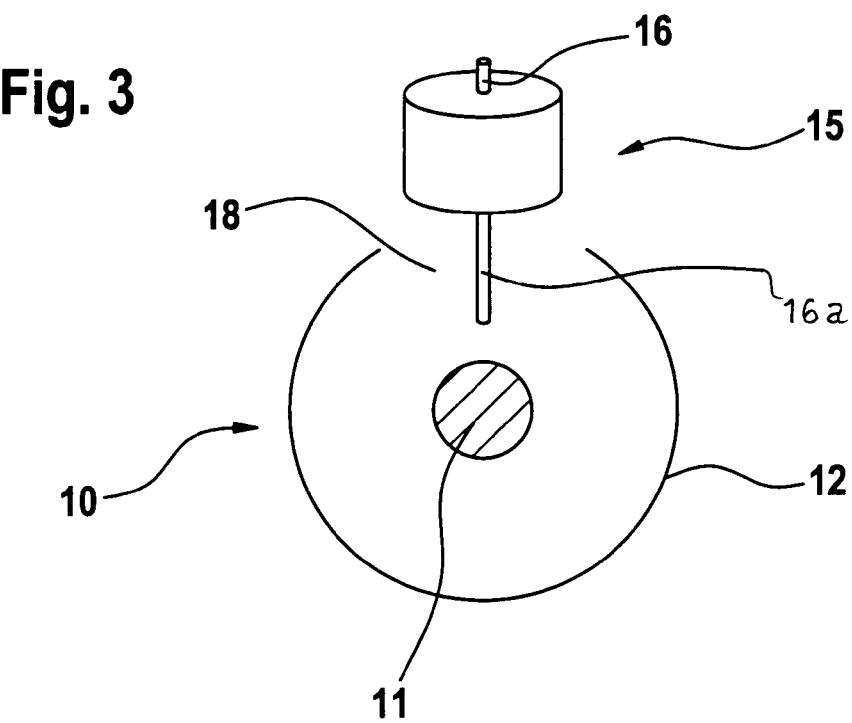
FIG. 3 shows a schematic sectional view through the transmission module on or in the vehicle body and the transmission module on or in the seat of a device according to the present invention in the coupled state.

In the exemplary embodiment illustrated in FIG. 3, transmission module 2 on or in the vehicle body has a coaxial structure. Signals and/or energy are injected and tapped here capacitively via inner conductor 16 of a coaxial cable 15 positioned in the vehicle seat, which is connected to electrical device 5 on or in the seat. The free end 16a of inner conductor 16 is implemented as a coupling pin, which is automatically introduced into slot 18 of the rail system when the vehicle seat is snapped into a locking element.

Figure 4:
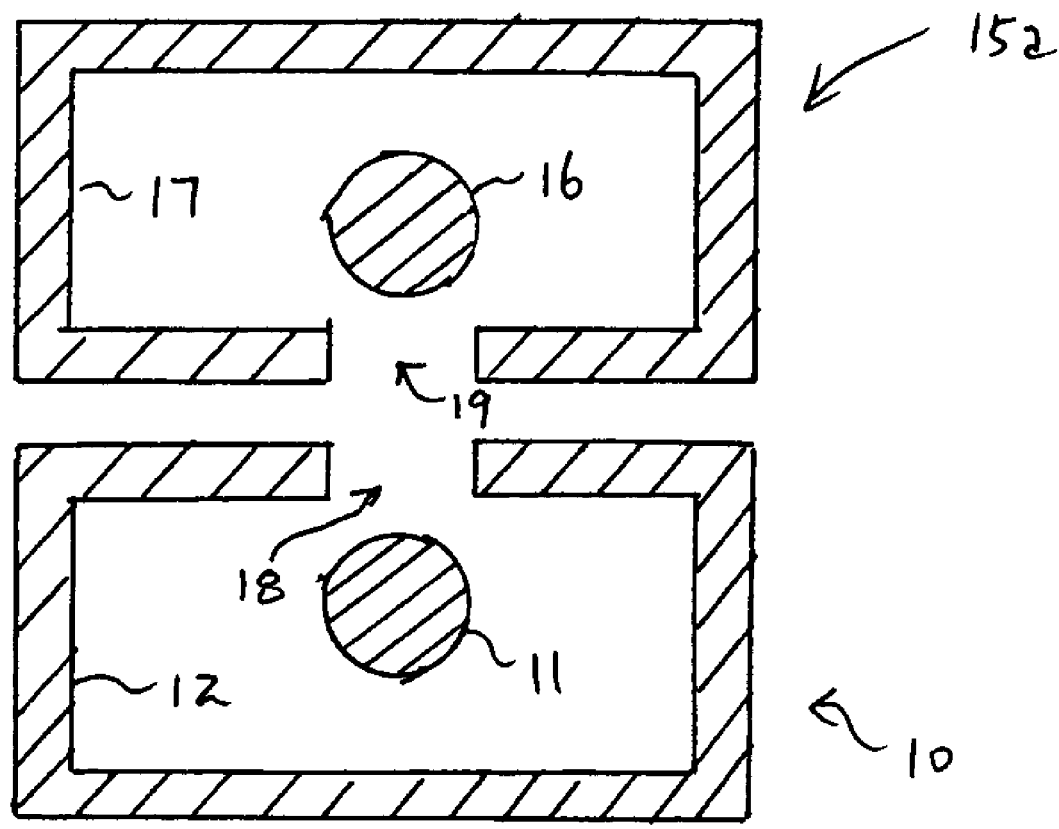
FIG. 4 shows a schematic cross-sectional view through the transmission module on or in the vehicle body and the transmission module on or in the seat of a device according to the present invention, which cross-sectional view illustrates aperture coupling.

To implement aperture coupling between both transmission modules 2 and 3, suitable apertures, such as slots, must be implemented in the rail system, which is laid out as a cable, and in a corresponding counterpart, which then functions as the transmission module on or in the seat. An example of such aperture coupling is illustrated in FIG. 4, which shows the vehicle body transmission module in the form of a coaxial rail or cable system 10 adjacent to the vehicle seat transmission module in the form of an example coaxial rail or cable system 15a. The coaxial rail system 10 has an outer conductor 12, an inner conductor 11 and at least one aperture 18, e.g., a slot in this case, and the coaxial rail system 15a has an outer conductor 17, an inner conductor 16 and at least one aperture 19, e.g., a slot in this case. The apertures 18 and 19 are aligned to enable signal and energy transmission between the coaxial rail systems 10 and 15a.

What is claimed is:

1. A device for transmitting at least one of signals and energy between a first electrical device on or in a body of a vehicle and a second electrical device on or in a seat of the vehicle, the vehicle having a rail system for the vehicle seat, the device comprising:

a first transmission module assigned to the first electrical device and a second transmission module assigned to the second electrical device, the first and second transmission modules forming a high-frequency wireless transmission path, the first transmission module being situated on or in the vehicle body and being integrated into the rail system, the second transmission module being situated on or in the vehicle seat and being adapted to be coupled into the rail system in such a way that at least one of the signal and energy transmission occurs via a displacement current generated in the rail system.

2. The device according to claim 1, wherein at least a part of the rail system is an electrical line for at least one of high-frequency energy and signals.

3. The device according to claim 2, wherein the rail system includes at least one of a coaxial cable, a two-wire line, a planar structure, and a waveguide.

4. The device according to claim 1, wherein the second transmission module provides a coupling for the at least one of the signal and energy transmission that occurs one of capacitively, inductively, and through aperture coupling, wherein for aperture coupling, the first transmission module and the second transmission module each have an aperture, and wherein the aperture of the first transmission module is aligned with the aperture of the second transmission module.

5. The device according to claim 2, wherein the second transmission module includes a coaxial cable whose inner conductor ends in a coupling pin, the coupling pin being adapted to be introduced into the electrical line for the at least one of the signal and energy transmission.

6. The device according to claim 2, wherein the second transmission module includes a coaxial cable whose inner conductor ends in at least one conductor loop, the conductor loop being adapted to be introduced into the electrical line for the at least one of the signal and energy transmission.

7. The device according to claim 2, wherein the electrical line has at least one aperture, the second transmission module including a further electrical line for at least one of high-frequency energy and signals, the further electrical line having least one aperture, the at least one aperture of the further electrical line on or in the seat being opposingly aligned with the at least one aperture of the electrical line on or in the vehicle body.

* * * * *

UNITED STATES PATENT AND TRADEMARK OFFICE
CERTIFICATE OF CORRECTION

PATENT NO.    : 6,960,993 B2
DATED         : November 1, 2005
INVENTOR(S)   : Bernhard Mattes et al.

It is certified that error appears in the above-identified patent and that said Letters Patent is hereby corrected as shown below:

Column 6,
Line 26, change "having least one aperture" to -- having at least one aperture, --.

Signed and Sealed this

Seventh Day of March, 2006

JON W. DUDAS
*Director of the United States Patent and Trademark Office*